Figure 1:
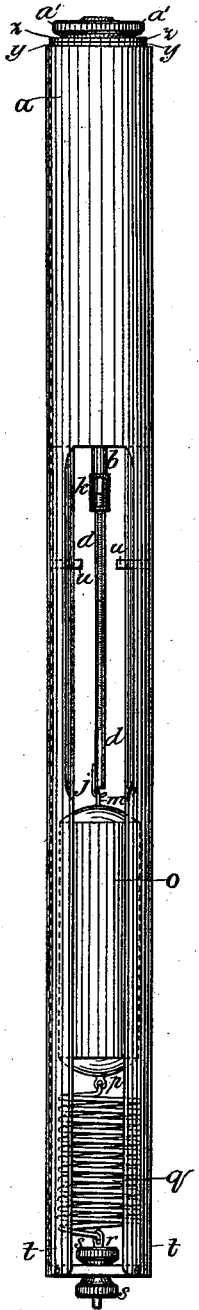

(No Model.)   5 Sheets—Sheet 1.

W. THOMSON.
NAVIGATIONAL SOUNDING APPARATUS.

No. 377,696.   Patented Feb. 7, 1888.

Attest
E. M. Bentley
H. S. Knight

Inventor
William Thomson
by Knight & Bro
Attys (No Model.)  5 Sheets—Sheet 2.
W. THOMSON.
NAVIGATIONAL SOUNDING APPARATUS.
No. 377,696. Patented Feb. 7, 1888.
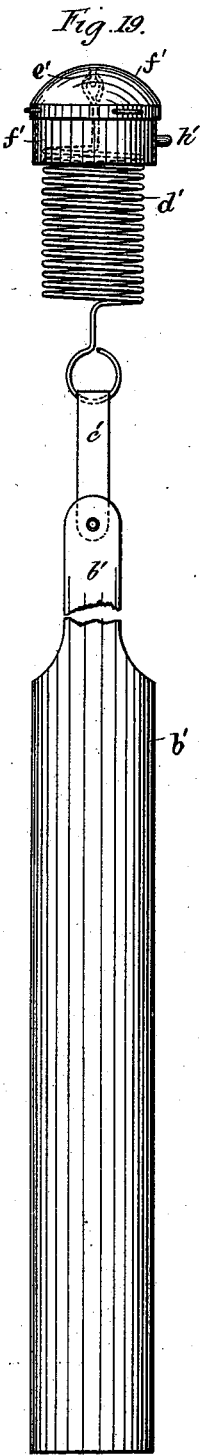
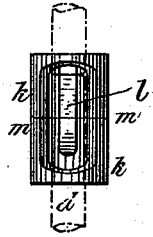
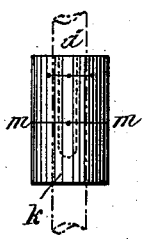
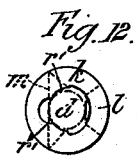
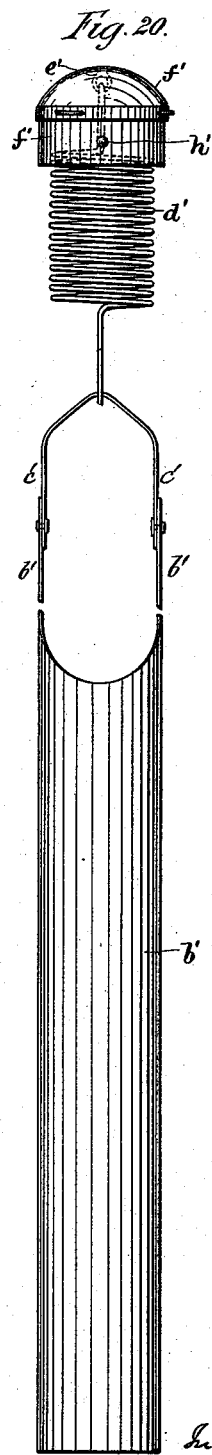
Attest
E. M. Britley
H. S. Knight
Inventor
William Thomson
by Knight Bros
Attys (No Model.) 5 Sheets—Sheet 3.
W. THOMSON.
NAVIGATIONAL SOUNDING APPARATUS.
No. 377,696. Patented Feb. 7, 1888.
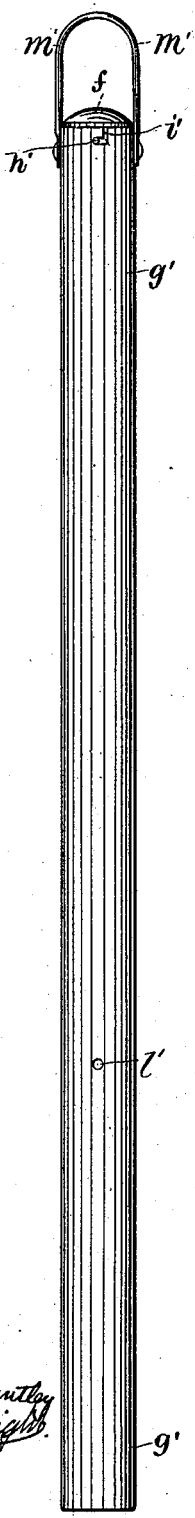
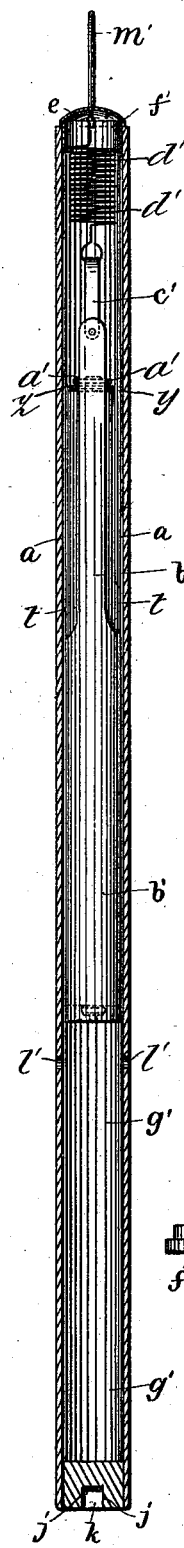
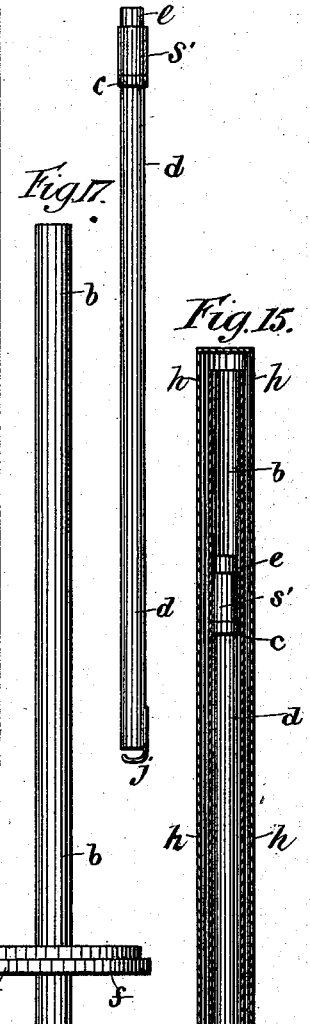
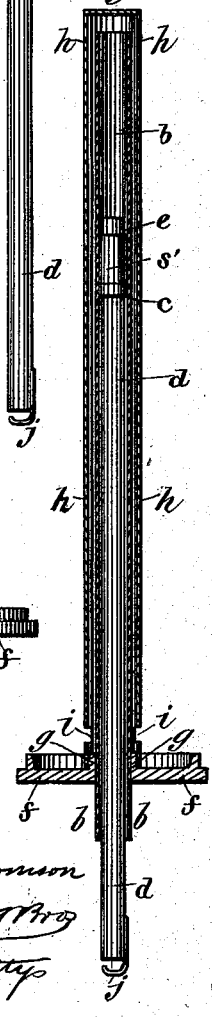

(No Model.) 5 Sheets—Sheet 4.

W. THOMSON.
NAVIGATIONAL SOUNDING APPARATUS.

No. 377,696. Patented Feb. 7, 1888.

Attest
E. M. Bentley
H. B. Knight

Inventor
William Thomson
by Knight & Bros
Attys (No Model.) 5 Sheets—Sheet 5.

W. THOMSON.
NAVIGATIONAL SOUNDING APPARATUS.

No. 377,696. Patented Feb. 7, 1888.

UNITED STATES PATENT OFFICE.

WILLIAM THOMSON, OF GLASGOW, COUNTY OF LANARK, SCOTLAND.

NAVIGATIONAL SOUNDING APPARATUS.

SPECIFICATION forming part of Letters Patent No. 377,696, dated February 7, 1888.

Application filed June 13, 1887. Serial No. 241,186. (No model.) Patented in England October 14, 1885, No. 12,240; in Germany May 2, 1886, No. 37,879, and in France August 14, 1886, No. 177,692.

*To all whom it may concern:*

Be it known that I, Sir WILLIAM THOMSON, Knight, of Glasgow College, Doctor of Laws and Professor of Natural Philosophy in the University and College of Glasgow, in the county of Lanark, North Britain, have invented an Improved Navigational Sounding-Machine, (for which I have obtained Letters Patent No. 12,240 in Great Britain, dated October 14, 1885; Letters Patent No. 37,879 in Germany, dated May 2, 1886, and Brevet d' Invention No. 177,692 in France, dated August 14, 1886,) of which the following is a specification.

This invention relates to an improved navigational sounding-machine.

The apparatus consists of an improved depth-recorder and a drum on which are coiled about three hundred fathoms of steel wire with a brake arrangement analogous to that described in my previous Letters Patent, No. 352,589, dated November 16, 1886.

The depth-recorder consists of a bottle having a neck prolonged inwardly, constituting a smooth cylinder, in which a piston is fitted with a leather or equivalent collar, so as to be nearly water-tight against a head of water of, say, one hundred fathoms, and yet to move with but small frictional resistance. The fluid-pressure tending to thrust the piston into the bottle is balanced by a spiral spring. The greater the pressure the farther it is pushed in. A light marker, pushed along the piston-rod and retained by friction in the extreme position to which it is pushed while the instrument is let down to the bottom of the sea and drawn up again, shows on a scale of equal or nearly equal divisions the depth that has been reached. Either the bottle or the piston may be fixed to the main frame of the instrument, and the other may be pulled direct by the spiral spring. Whichever of the two is fixed is placed, preferably, uppermost, and the other is thrust upward by the fluid-pressure which is balanced by the downward pull of the spiral spring. When the piston is fixed and the bottle movable, the capacity of the bottle may be made sufficient to float its own weight and half the weight of the spiral spring, so as to annul the effect of shock on the bottom in disturbing the relative position of piston and bottle. It is preferred to fix the bottle and let the piston be pushed up from below by the fluid-pressure, and to attach a water-tight floater to buoy up the weight of the piston and half the spring.

To prevent the shock on the bottom from disturbing the marker, I let down the main frame of the instrument into a tall narrow can kept full of water, and hang this can by a spiral spring inside the sinker, which is a stout open tube of galvanized iron loaded with a weight—such as lead—filling a short length of it near its lower end. The top of this tube is closed by a removable cover which carries the hanging spring. Too much of impulsive fluid-pressure within the sinker at the instant of striking the bottom is obviated by a hole or holes in the iron tube above the lead barrier. A piece of cloth or canvas may be tied over these holes to prevent sand from the bottom of the sea from getting in.

The bottle is provided with a screw-plug, by which, as often as is necessary, any water that has leaked into it may be run out.

To prevent the wire from jumping off the drum, pieces of springy sheet-iron are fixed to a stiff cylindrical sheath which surrounds the wire-wheel. These pieces are so shaped and so placed that their ends touch lightly on the inner edge of the rim of the wire-wheel while it flies round.

Figure 2:
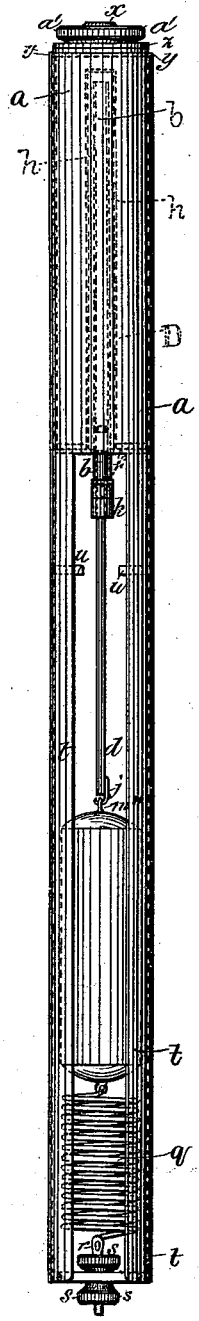
Figure 3:
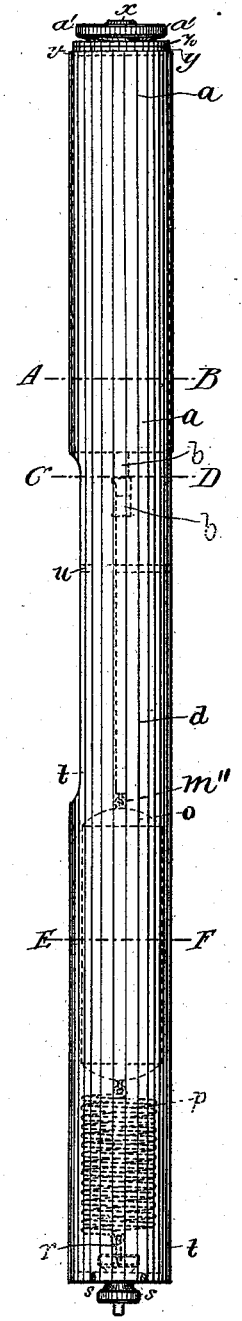
Figure 4:
Figure 5:
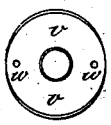
Figure 6:
Figure 7:
Figure 8:
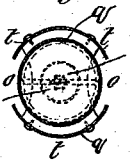
Figure 23:
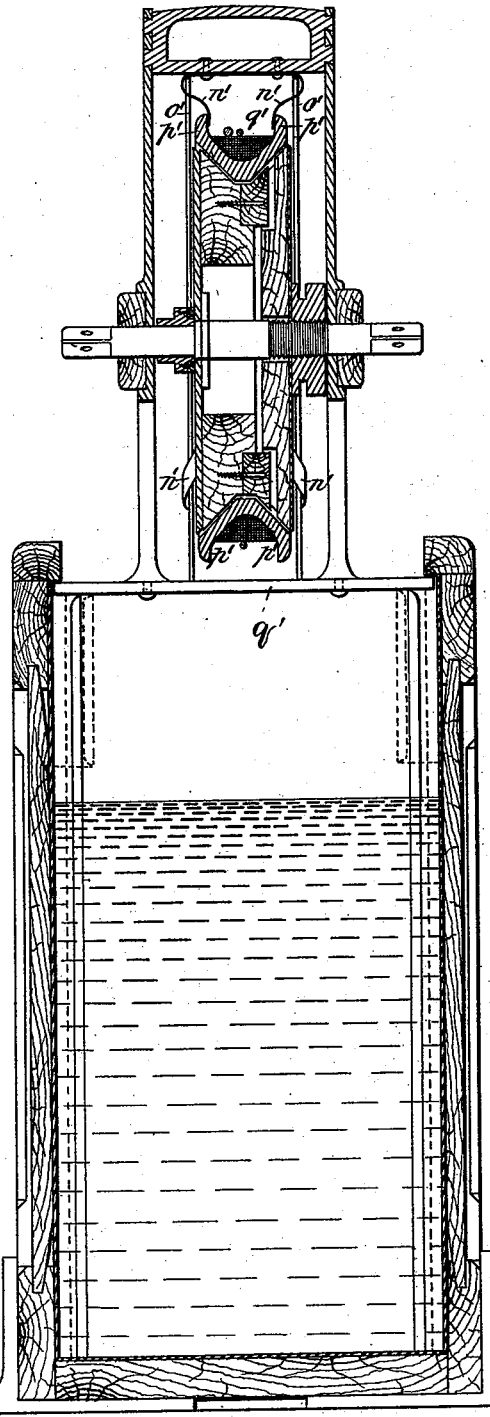
Figure 24:
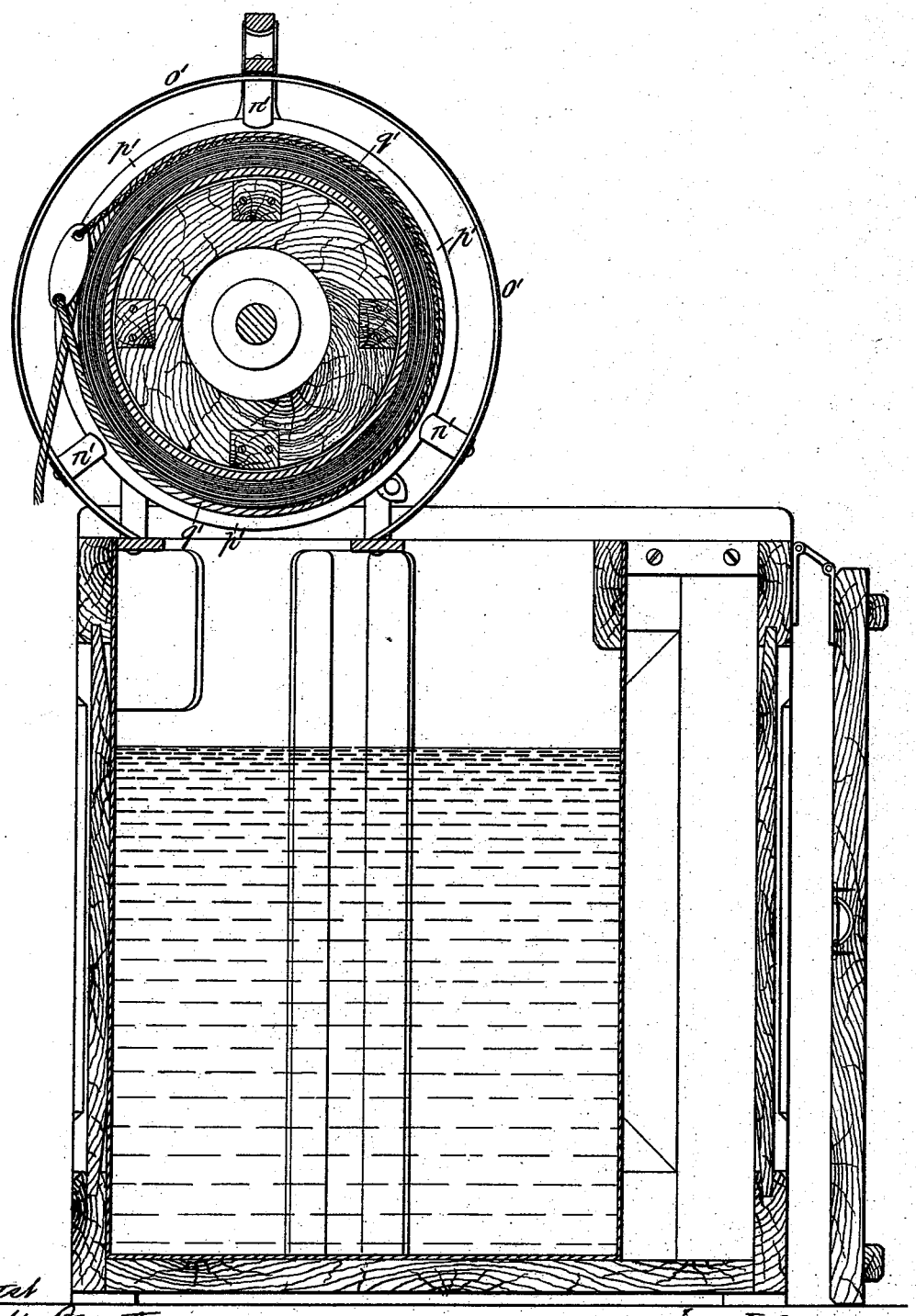

In the drawings, Figures 1, 2, and 3 are respectively elevations of the front, back, and side of a depth-recorder constructed according to my present invention. Fig. 4 is a plan of the same. Fig. 5 is a plan of the same after a portion has been removed, as hereinafter more particularly described. Figs. 6, 7, and 8 are transverse sections of the same, taken, respectively, on the lines A B, C D, and E F, Fig. 3. Figs. 9, 10, and 11 are respectively front, side, and rear elevations of the marker, drawn to an enlarged scale. Fig. 12 is a plan of the same. Fig. 13 is a transverse section thereof. Fig. 14 is an elevation of the tube or cover plate. Fig. 15 is a vertical section thereof. Fig. 16 is an elevation of the tube. Fig. 17 is an elevation of the neck and cap or cover plate. Fig. 18 is an elevation of the neck. Figs. 19 and 20 are elevations of the can and its connections in and by which the depth-recorder, Figs. 1, 2, and 3, is supported within the sinker when lowered down into the sea. Fig. 21 is an elevation of the sinker, drawn to a reduced scale. Fig. 22 is a longitudinal section of the same, also drawn to a reduced scale, and showing the depth-recorder supported in its position therein when ready for taking a sounding. Figs. 23 and 24 are respectively a transverse and a longitudinal section of a sounding-machine constructed according to and constituting a further part of my present invention.

The depth-recorder as represented at Figs. 1 to 18, inclusive, consists of a bottle, the outer casing, $a$, of which is preferably of metal and the neck $b$ of which, as represented in dotted lines at Fig. 2 and in elevation at Fig. 17, projects inwardly and constitutes a smooth cylinder, in which a piston, D, is free to slide longitudinally. This piston, as represented more particularly in the vertical section shown at Fig. 15 of the annexed drawings, consists of the cup-leather $c$, which is secured to the end of the rod $d$ by means of the screw $e$ and the ferrule $s'$, or by the equivalents thereof. The tube, which constitutes the neck $b$, is secured in the cap or cover plate $f$, which plate is soldered into the lower end of the outer casing, $a$, as shown in dotted lines in Fig. 2. The plate $f$ is formed with the short ferrule $g$, upon which the tube $h$ is secured. This tube $h$ is shown in elevation at Fig. 14 as connected with the plate $f$, and in elevation at Fig. 16 when detached therefrom, and, as represented more particularly at Fig. 15, the said tube is closed at its upper end, while at its lower end are formed the openings $i$, which allow any water which may have leaked in around the cup-leather $c$ to pass to the lower part of the bottle $a$. The rod $d$, at the upper end of which is the cup-leather $c$, extends downward and out from the neck $b$, and its lower end is provided with the hook $j$, or its equivalent. The surface of the rod $d$, as indicated at Fig. 1 of the annexed drawings, is engraved or otherwise marked with a scale of equal divisions, from which scale is subsequently read off the depth to which the recorder has been lowered into the water by the position of a light marker upon the said scale. This marker, which is shown upon an enlarged scale at Figs. 9, 10, and 11, in front, side, and rear elevations, respectively, and at Figs. 12 and 13, respectively, in plan and transverse sections, consists of the short vulcanite barrel or collar $k$, provided with the spring $l$, for exerting pressure upon or against the surface of the rod $d$ sufficient to retain the collar $k$ thereon in any position into which it has been moved. The said collar $k$ is further provided with four feet, $r'$, which bear against the front surface of the rod $d$, so as to reduce the friction to as little as possible. A portion of the front of the collar $k$ is removed, as represented more particularly at Figs. 9, 10, and 13, so that between the ends of the said collar $k$ a part of the scale-marking of the rod $d$ is left exposed to view—that is to say, in the manner indicated at Fig. 1. The thin wire $m$ is stretched across the last-mentioned opening in the collar $k$, and the depth is read off from the position of this said wire on the scale. The before-mentioned hook $j$ engages with the eye $m''$, which is secured to the upper end of the floater $o$, to the lower end of which is also secured a second and similar eye, $p$. With the eye $p$ the upper end of the spiral spring $q$ engages, and the lower end of the said spring engages with the eye $r$, which is secured by the adjustable nuts $s$ to the lower end of the rigid frame $t$. The frame $t$ is provided with the rigid stops $u$, against which the upper end of the floater $o$ abuts when the depth-recorder has been lowered to its maximum depth—that is to say, the greatest depth to the registering of which the said recorder has been adapted. The plate $v$, which closes the upper end of the bottle $a$, as shown at Figs. 4 and 5, has one, two, or more holes, $w$, formed through it, and it is further provided with the screw $x$, over which the leather or equivalent washer $y$ and metal washer $z$ are passed and secured in position by the screwed nut $a'$. By slackening the nut $a'$, and thereby the washers $y$ and $z$, any water that may have leaked into the bottle $a$ may be poured out through the holes $w$.

In lowering the hereinbefore-described depth-recorder down into the water for the purpose of taking a sounding, the said recorder is supported in a deep can which is suspended within the sinker. This can $b'$, which is shown in part at Figs. 19, 20, and 22, is pivoted at its upper part to the bent link $c'$, by the pivoting over of which link from its vertical position the depth-recorder is capable of being placed within the can $b'$. The said can $b'$ is suspended by the link $c'$ and spiral spring $d'$, the upper end of which engages with the eye $e'$, secured to the under side of the lid or cover $f'$. The sinker, which is represented on a reduced scale at Figs. 21 and 22, consists of the tube $g'$, into the upper end of which the lid or cover $f'$ is capable of being locked by the pin $h'$, which engages with the slot $i'$ in the said tube $g'$. The lower end of the tube $g'$ is closed by the leaden filling $j'$, in the under surface of which is formed the recess $k'$. In this recess $k'$, at the time of taking a sounding, a piece of tallow is placed, so that a specimen of the bed of the sea or river may be brought up. Above the before-mentioned leaden filling $j'$ there are formed one, two, or more holes, $l'$, over which there may be tied a piece of cloth or canvas, if found necessary, to prevent the sand from getting in, and at the upper part the tube $g'$ has the bow or bent link $m'$ pivoted to it.

In order to prevent the wire from jumping off the drum of the sounding-machine constructed according to my hereinbefore-mentioned previous Letters Patent, No. 352,589, dated November 16, 1886, I secure two, three, or more pieces of springy sheet-iron, or the equivalent thereof, to the cylindrical sheath which surrounds the said drum or wire-wheel. As shown at Figs. 23 and 24 of the annexed drawings, these springs $n'$ are riveted or otherwise secured to the sheath $o'$, and are otherwise so arranged that their ends press against the inner surfaces of the flanges $p'$. In the event of the wire $q'$ becoming slack and rising out of the groove of the drum, it is prevented from passing over the flanges thereof by means of the springs $n'$, the inclination of which tends always to replace the said wire in the groove of the drum.

I claim—

1. The combination of a stationary bottle, the neck, the piston having a scale, the marker having an indicating-wire, and a balance-spring, substantially as described.

2. The combination of a stationary bottle, the neck, the piston having a scale, the marker, a balance-spring, and a float, substantially as described.

3. The combination of the bottle, the piston, the neck, the marker, the float, and the spiral spring, substantially as described.

4. The combination of the tubular sinker, the lid or cover having a spiral spring, and the deep can supported on the spring, substantially as described.

5. The combination of a drum having flanges and the sheath having springs bearing against the inner faces of the flanges, substantially as described.

In testimony whereof I have signed my name to this specification in the presence of two subscribing witnesses.

WILLIAM THOMSON.

Witnesses:
 JOHN LIDDEE,
 JOSEPH H. PEARSON,
 Both of 115 St. Vincent Street, Glasgow.